US010341275B2

(12) United States Patent
Carriero et al.

(10) Patent No.: US 10,341,275 B2
(45) Date of Patent: Jul. 2, 2019

(54) SHARED CONTENT ITEM COMMENTING

(71) Applicant: Dropbox, Inc., San Francisco, CA (US)

(72) Inventors: Thomas Carriero, San Francisco, CA (US); Mark Delamere, San Francisco, CA (US); Phil Rha, San Francisco, CA (US); Jon Vincent, San Francisco, CA (US); Sujay Jayakar, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 254 days.

(21) Appl. No.: 13/855,853

(22) Filed: Apr. 3, 2013

(65) Prior Publication Data
US 2014/0304618 A1 Oct. 9, 2014

(51) Int. Cl.
*G06F 3/048* (2013.01)
*H04L 12/58* (2006.01)
*H04L 12/18* (2006.01)

(52) U.S. Cl.
CPC .......... *H04L 51/08* (2013.01); *H04L 12/1818* (2013.01)

(58) Field of Classification Search
None
See application file for complete search history.

(56) References Cited

U.S. PATENT DOCUMENTS

| 7,418,656 B1* | 8/2008 | Petersen ............... G06F 17/241 715/230 |
| 7,702,728 B2 | 4/2010 | Zaner et al. |
| 7,779,347 B2* | 8/2010 | Christiansen ......... G06F 17/241 715/230 |
| 9,892,104 B2* | 2/2018 | Haynes, II ......... G06Q 30/0201 |
| 2003/0101237 A1 | 5/2003 | Ban et al. |
| 2003/0204490 A1* | 10/2003 | Kasriel ................. G06F 17/241 |
| 2004/0085354 A1* | 5/2004 | Massand ............. G06F 17/2229 715/751 |
| 2006/0048047 A1* | 3/2006 | Tao ....................... G06F 17/241 715/232 |
| 2006/0053364 A1* | 3/2006 | Hollander ......... G06F 17/30873 715/232 |

(Continued)

OTHER PUBLICATIONS

Lifehacker, By Adam Pash & Gina Trapani, Jun. 28, 2011, Chapter 8 Hack 67: Access Your Most Important Files Anywhere with Dropbox (Year: 2011).*

(Continued)

*Primary Examiner* — Mahelet Shiberou
(74) *Attorney, Agent, or Firm* — Polsinelli PC

(57) ABSTRACT

Various embodiments provide a commenting system for multiple users to provide and share comments to shared documents. For example, users can share a web link to a collection of content items, such as documents, spreadsheets, photos, and any other media, with other users stored in an online content management system. The commenting system can provide a comment interface displayable alongside a respective content item and the comments can be saved for each user and the content item with associated comments can be synced across the multiple users. The comments can scroll independently of the content in a content item or the comments can be linked to a location therein and the scrolling of the comments can be linked to the scrolling of the content item such that corresponding comments are displayed.

15 Claims, 7 Drawing Sheets

(56) References Cited

U.S. PATENT DOCUMENTS

| | | | |
|---|---|---|---|
| 2007/0271502 A1* | 11/2007 | Bedi | G06F 17/248 |
| | | | 715/230 |
| 2008/0059539 A1* | 3/2008 | Chin | G06Q 10/10 |
| 2008/0270406 A1* | 10/2008 | Flavin | G06F 17/30722 |
| 2009/0199082 A1* | 8/2009 | Hollander | G06F 17/30873 |
| | | | 715/230 |
| 2009/0249224 A1* | 10/2009 | Davis | G06Q 10/10 |
| | | | 715/753 |
| 2009/0276455 A1 | 11/2009 | Yu et al. | |
| 2010/0095198 A1* | 4/2010 | Bultrowicz | G06Q 10/00 |
| | | | 715/234 |
| 2011/0154192 A1* | 6/2011 | Yang | G06F 17/2288 |
| | | | 715/256 |
| 2011/0258545 A1 | 10/2011 | Hunter | |
| 2011/0276396 A1 | 11/2011 | Rathod | |
| 2011/0282734 A1 | 11/2011 | Zurada | |
| 2012/0066581 A1* | 3/2012 | Spalink | G06F 17/30716 |
| | | | 715/232 |
| 2012/0084667 A1 | 4/2012 | Hickman | |
| 2012/0110474 A1* | 5/2012 | Chen et al. | 715/753 |
| 2012/0124620 A1 | 5/2012 | Nishizawa et al. | |
| 2012/0151383 A1* | 6/2012 | Kazan et al. | 715/753 |
| 2012/0323794 A1 | 12/2012 | Livshits | |
| 2012/0331568 A1* | 12/2012 | Weinstein et al. | 726/29 |
| 2013/0028574 A1 | 1/2013 | Srinivas et al. | |
| 2013/0198664 A1 | 8/2013 | Matas et al. | |
| 2013/0311565 A1 | 11/2013 | Barry | |
| 2013/0325954 A1 | 12/2013 | Cupala et al. | |
| 2013/0328932 A1 | 12/2013 | Kim et al. | |
| 2014/0033013 A1* | 1/2014 | Shaver | G06F 17/24 |
| | | | 715/230 |
| 2014/0033294 A1 | 1/2014 | Swineford | |
| 2014/0101780 A1* | 4/2014 | Zuber | G06Q 30/04 |
| | | | 726/28 |

OTHER PUBLICATIONS

International Search Report dated Nov. 26, 2014, issued in corresponding International Application No. PCT/US14/32857.

International Search Report dated Apr. 28, 2015, issued in related International Application No. PCT/US14/56071.

* cited by examiner

SHARED CONTENT ITEM COMMENTING

TECHNICAL FIELD

The present technology pertains to editing shared files, and more specifically pertains to enabling users viewing and/or editing shared files to provide shared comments for other user to view.

BACKGROUND

Various applications allow users to view and/or edit the same file or content. In order to add comments or view changes to a document, however, users have been limited to embedding comments in the text of the document or by using a commenting or versioning feature of the native application used to create the file. Furthermore, if the user only has read access to the document, the user will have to download a copy of the file, add their respective comments and send it back to the owner, or send the owner comments through some other mechanism, such as email.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for providing a document commenting interface enabling users to add comments to content items. For example, a content item, such as a document or image, can be shared, viewed, and/or edited, by multiple users, each of whom can provide comments to a commenting interface to share their comments or thoughts with the other users.

A content management system, in accordance with various embodiments, can make a content item available for retrieval by providing the content item for display on, for example, a first computing device of a user through a network. The content item can include a comment interface displayable therewith, which can be viewable between the first computing device and at least one second computing device through an account with the content management provider. Accordingly, the user can provide comments to the comment interface viewable on each of the first computing device and the at least one second computing device. Further, the content item can be shared among other users having an account with the online content management system and each user can provide comments to the comment interface to share their thoughts and comments with other users viewing and/or editing the content item.

In one example, the comment interface can be provided through an application, plug-in, or other interface, associated with the content management system and, therefore, unassociated with the native application of the content item. The comments can also be displayed in a variety of ways, such as in a comment section alongside the content of the document. In some cases, the comments can scroll independently of the content in the document. Alternatively, the comments can be linked to a location in a document and the scrolling of the comments can be linked to the scrolling of the document such that corresponding comments are displayed.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the art will recognize that other components and configurations may be used without departing from the spirit and scope of the disclosure.

The disclosed technology addresses the need in the art for enabling users to provide information, such as comments, metadata, or the like, to content items viewable by multiples users across multiple computing device, platform, and file types. In particular, users can provide comments to a comment section associated with a content item, such as a document or image, which is available for viewing and/or editing through an online content management system. In one example, the comment section can be provided through an application, plug-in, or other interface, associated with the content management system and, in some instances, unassociated with the native application of the content item.

Figure 1:
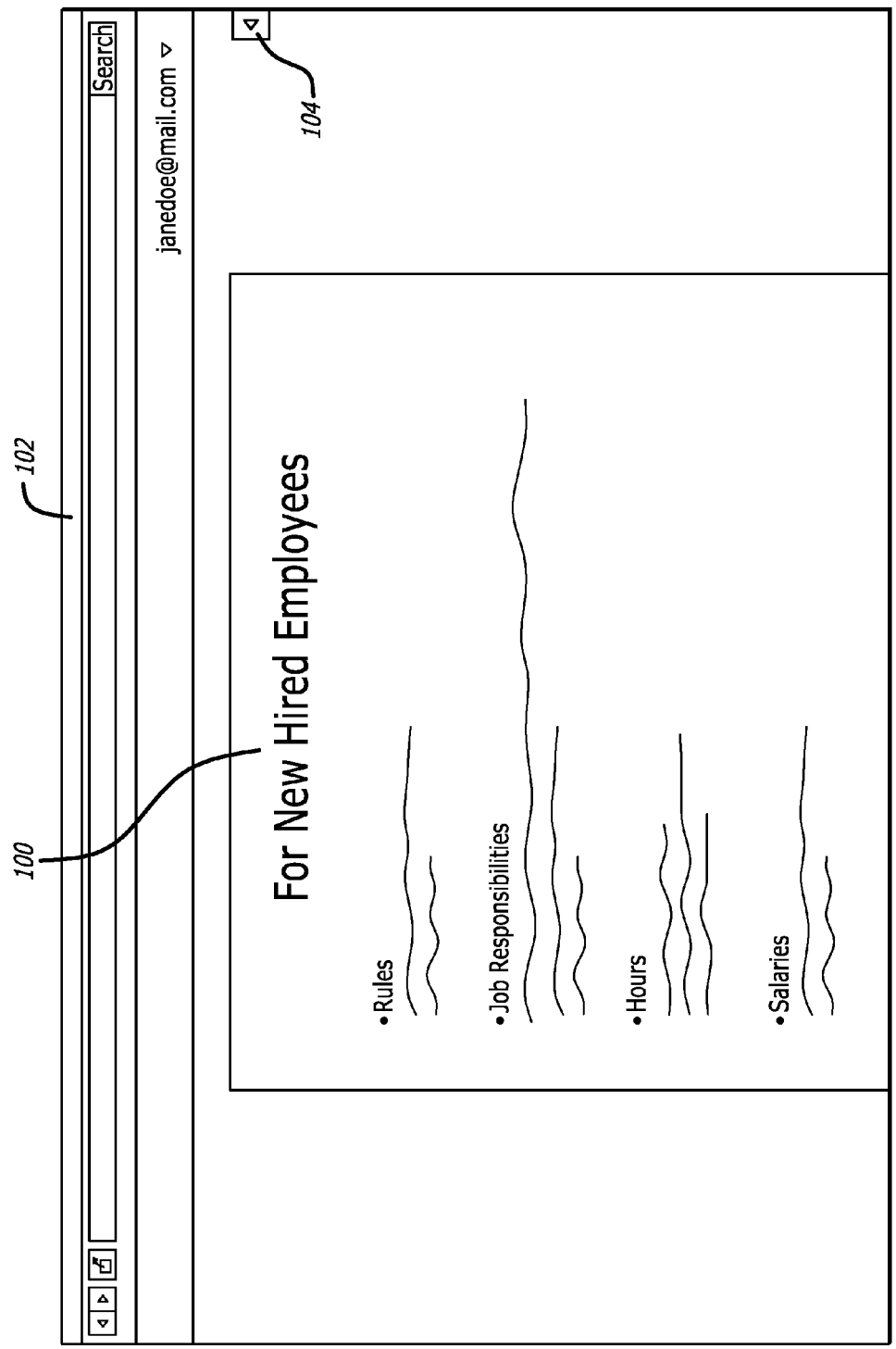
FIG. 1 shows an exemplary content item in accordance with at least one embodiment.

FIG. 1 shows example document 100 displayed on browser 102, in accordance with at least one embodiment. In various embodiments, document 100 is one of many content items or files available for retrieval from an online content management system that can offer services, such as cloud storage, file synchronization, and various other types of client software. For example, such a system may allow users to create a folder on each of their computing devices, such as their smartphone, tablet computer, desktop computer, laptop, and the like. The folder can be synchronized across all the devices so that the content of the folder, when changed or updated, appears the same when viewed across all devices, regardless of the device or platform type. Files placed in such a folder can be accessible through a website or mobile application associated with one or more of the devices and can also be shared with the devices of other users.

Figure 2:
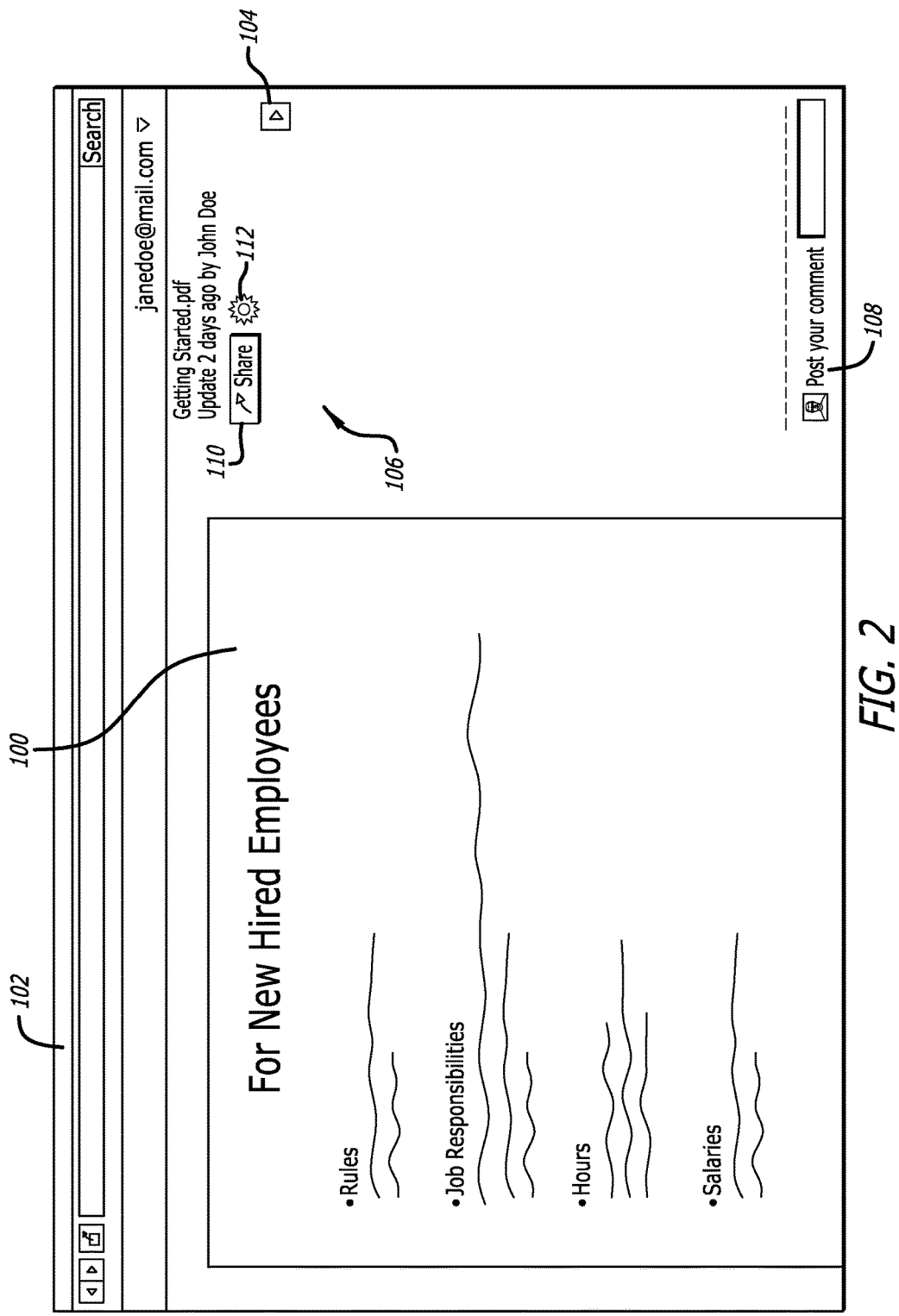
FIG. 2 shows an exemplary content item with a comment section in accordance with at least one embodiment.

In accordance with at least one embodiment, the online content management system can enable users to provide comments to content items. In one example a user can choose to provide comments to document 100 by selecting icon 104, which, in one example, will expand comment interface or section 106, as shown in FIG. 2. In this example, comment section 106 includes text field 108 for a user to provide their comment, a share icon 110 to share document 100 with other users, and settings icon 112 for changing user and account preferences.

Figure 3:
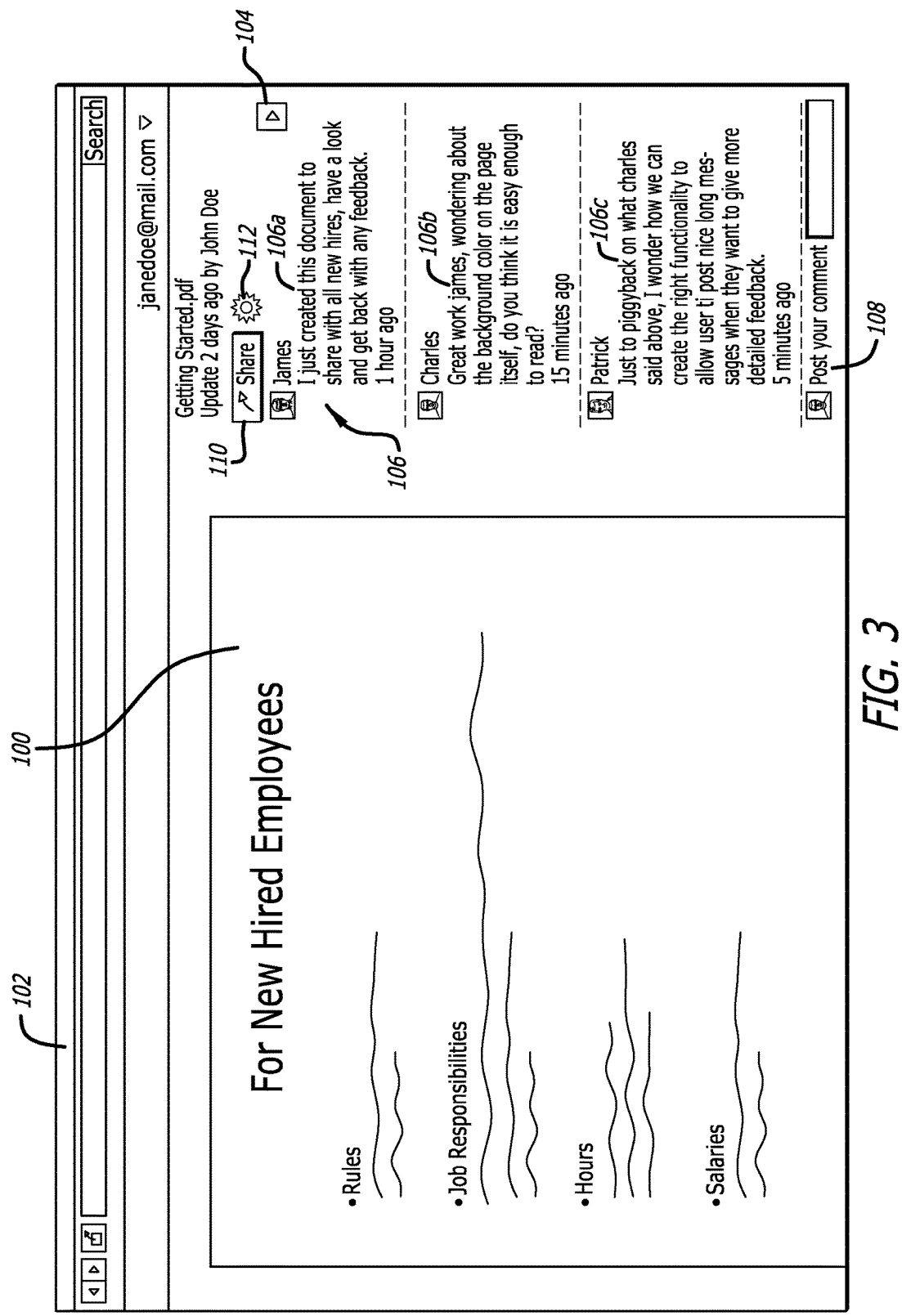
FIG. 3 shows another exemplary content item with a comment section in accordance with at least one embodiment.

In at least one embodiment, a user can provide one or more comments to text field 108 after, for example, editing document 100 and sharing the document with other users. FIG. 3 shows an example of document 100 after it has been shared with and viewed by other users. In this example, there are three users and each has provided comments to an initial question posed by a first user in comment 106a. In this example, the first user has created document 100 to give to new hires, has shared document 100 with a second and third user, and has asked them for their feedback. Accordingly, the second user has provided their feedback in comment 106b, and the third user has provided their feedback in comment 106c.

In one example, each user could have provided edits to document 100 and explanations for their edits. In one example, each of the comments could be linked to a specific location in the document, such as to reword or add content to a specific paragraph. Alternatively, the comments could be general and about the document as a whole, such as about the background color of document 100 in comment 106b. Further, both linked comments and general comments could simultaneously be provided to comment section 106. For example, comments to a specific location or section could be linked to the specific location in document 100, such that when a user selects a respective comment, they are brought to the location in document 100 associated with the respective comment. Accordingly, the general comments, when selected, would not navigate the user to a location since they are not associated with any particular location.

Accordingly, after each user has provided their comments, the file associated with document 100 is synced across each of the users and each of the user's computing devices in order for each user to have access to a most recent version of document 100, including the most recent comments from all shared users. The synchronization can be performed as a "push," when a respective user saves or closes document 100, thereby pushing the most recent version to each device associated with the users or as a "pull," when a respective user requests access to document 100 in order to ensure that changes to document 100 and/or comment section 106 are reflected across all associated computing devices.

Further, local peer-to-peer synchronization could also be utilized within the scope of various embodiments discussed herein. For example, devices associated with the same user or having access to the same shared folder can determine whether they are on the same local area network, and if so establish a secure connection (e.g., via SSL) and effect synchronization through peer-to-peer transfer of files. The synchronized files may, typically, only be provided to computing devices associated with a user who provided the files. For example, if a particular user registers his tablet computer, laptop, and smartphone with the content management system, then those three devices will synchronize the files with those devices and otherwise make the file available to the user via the user's login (e.g., via a web-based or app-based interface). Accordingly, the content management system will not by default make the files available to devices of other users or via logins other than that of the user who provided the files.

Figure 4:
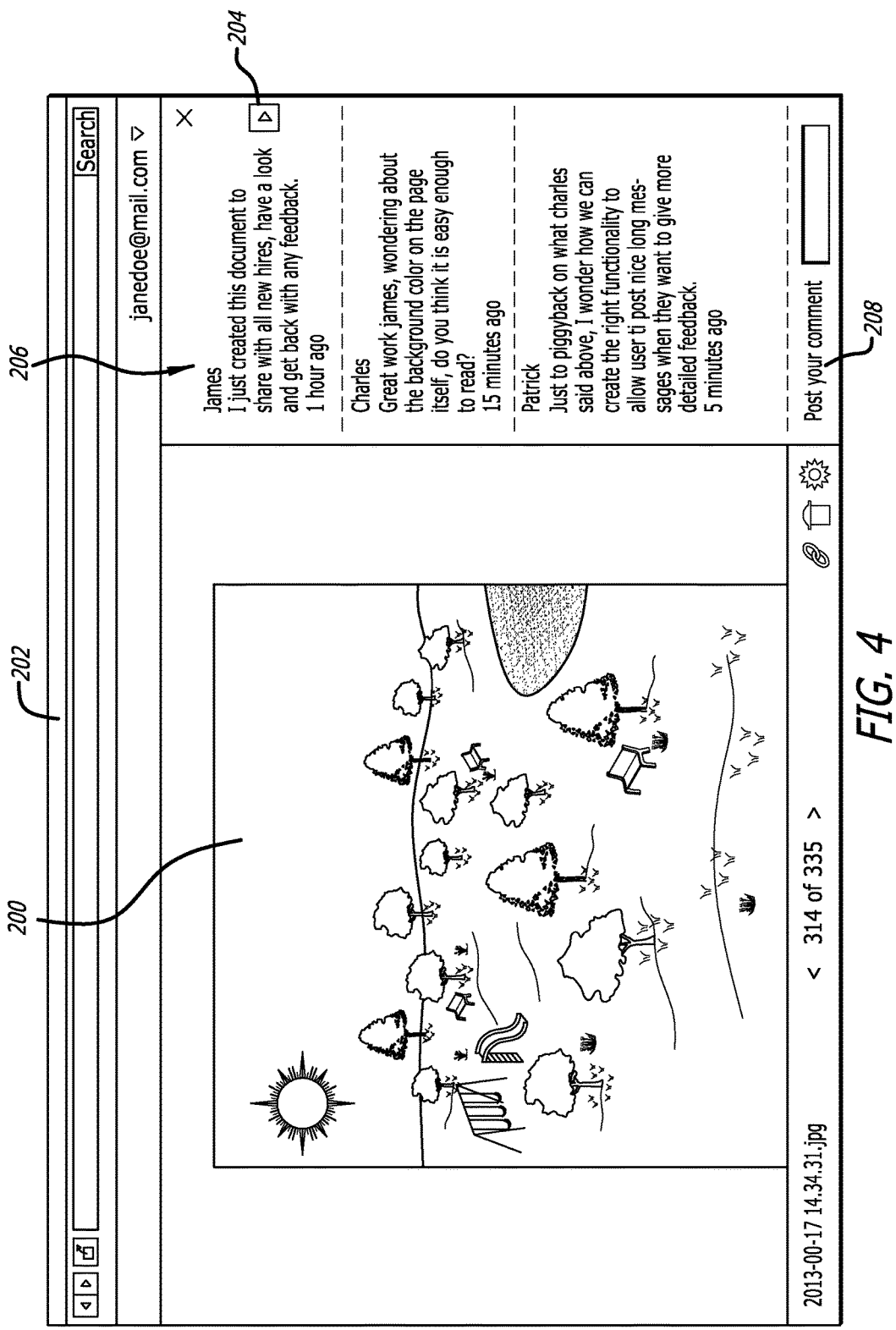
FIG. 4 shows an exemplary content item with a comment section in accordance with at least one embodiment.

As discussed elsewhere herein, the comment section 106 can be provided across devices, platforms, and file types. For example, the content management system can provide storage, retrieval, editing, and commenting service for content items such as word processing documents, spreadsheets, presentations, videos, streaming content, images, and any other content or file type. Accordingly, FIG. 4 shows image 200 displayed on browser 202, in accordance with at least one embodiment. In this example, image 200 could be part of a photo album shared among a user's friends and family, therefore, the user's friends and family could provide comments by typing a message in the text field 208 of comment section 206 to be shared among the shared users, as described above with respect to FIGS. 1-3. Additionally, the user could upload the image 200 for private storage and safekeeping with the online content management system and provide comments to comment section 206 to jot down notes about particular memories, places, and the like, associated with image 200 or to a particular album in general.

In at least one embodiment, the comment section, in accordance with various embodiments can be provided, by the content management provider, on an interface different from a native application associated with a respective content item. For example, the comment section could be an application layer independent from, or layered on top of, the native application of a respective file type being displayed. In one example, the layer could be associated with an application provided by the online content management system or by a browser plug-in when viewed through a web browser. In one example, this could be achieved by adding metadata to each content item that is readable by the application provided by the online content management system or the metadata could point to a location with comment data that is retrievable by the online content management system. Alternatively, the comments may also be displayed though the native application associated with the content item.

Further, the comments can be of different types. For example, a first type can be automatically created by the online content management system based on versioning information. In this example, the online content management system could maintain version information, which could be incorporated into the metadata and then displayed to any viewer of the file. For example, in file "commenting screenshot 1" of the comments could indicate that this respective version of the document is v4 along with information such as who and when it was created.

Accordingly, a second type of comment can be created by a user. For example, a user could pick a location in a file, such as a document, image, or presentation, for a comment and then add text to that particular location. For example, in file "commenting screenshot 1" a single comment could be attached to a respective slide (of the document, image, or presentation) at a point labeled A, along with the corresponding comment displayed in the comments section. A comment can also identify a particular user that left the comment along with the date and time the comment was provided.

Figure 5:
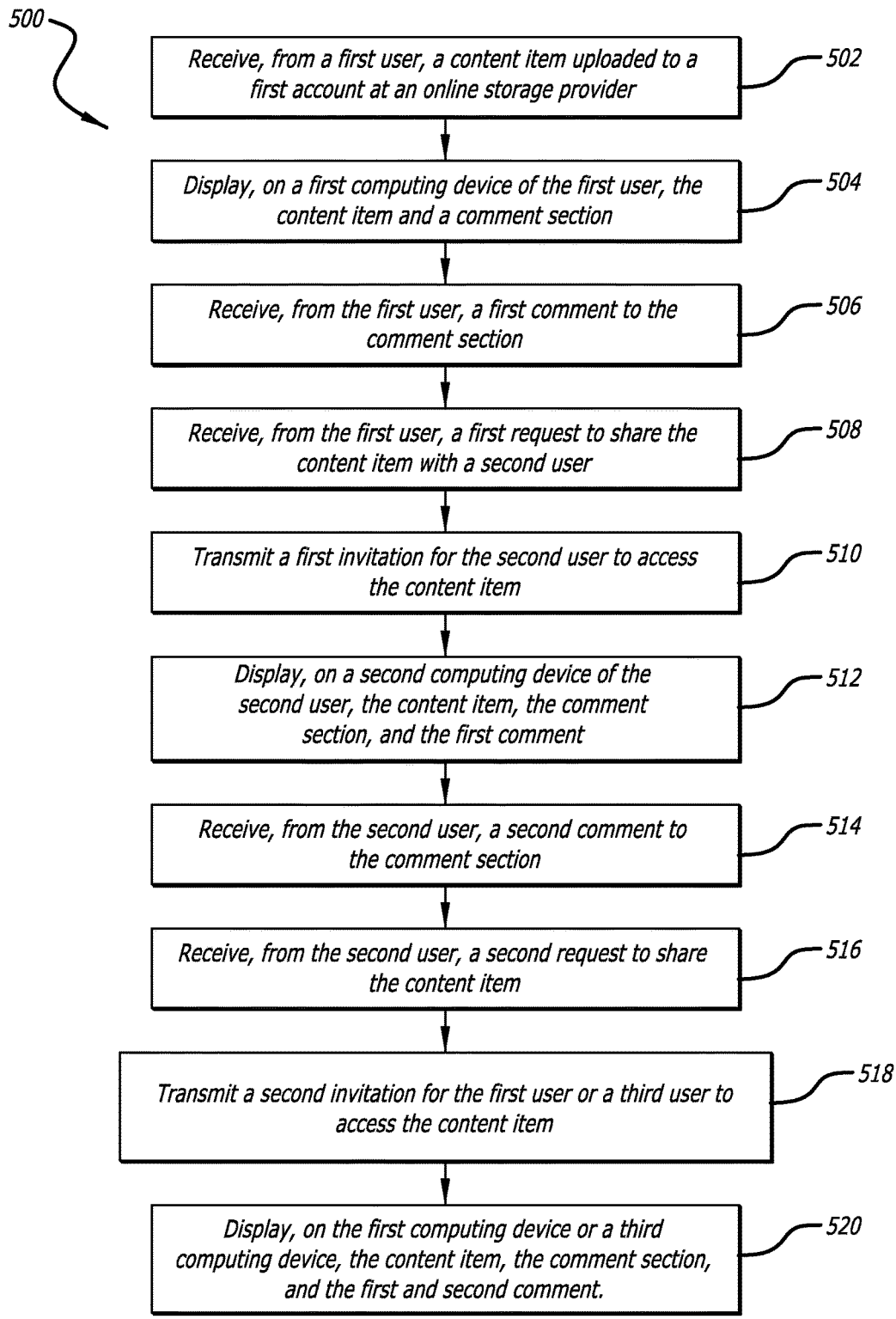
FIG. 5 shows an example process in accordance with at least one embodiment.

FIG. 5 illustrates an example process 500 for enabling users to provide comments to shared documents through a content management system in accordance with various embodiments. It should be understood that, for any process discussed herein, there can be additional, fewer, or alternative steps performed in similar or alternative orders, or in parallel, within the scope of the various embodiments unless otherwise stated.

In this example, a file uploaded to a first account of an online content management provider is received 502 from a first user and the file, along with a comment section associated with the file, is displayed 504 on an interface of a first computing device of the first user. Accordingly, a first comment, from the first user, is received 506 to the comment section. Subsequently, a first request to share the file with a second user having a second account with the online content management provider is received 508 from the first user and a first invitation for the second user to access the file is transmitted 510. The first invitation is accepted and the file, the comment section associated with the file, and the first comment from the first user are displayed 512 on a second computing device of the second user.

In this example, a second comment is received 514 to the comment section from the second user and a second request to share the file with the first user and a third user that has a third account with the online content management provider is received 516 from the second user. Accordingly, a second invitation is transmitted 518 and the file, the comment section, and the first comment and the second comment are subsequently displayed to the first and third users. Further, in addition to comments to the comment section, additions or revisions, if the file is editable, can also be provided and shared amongst the users.

Figure 6:
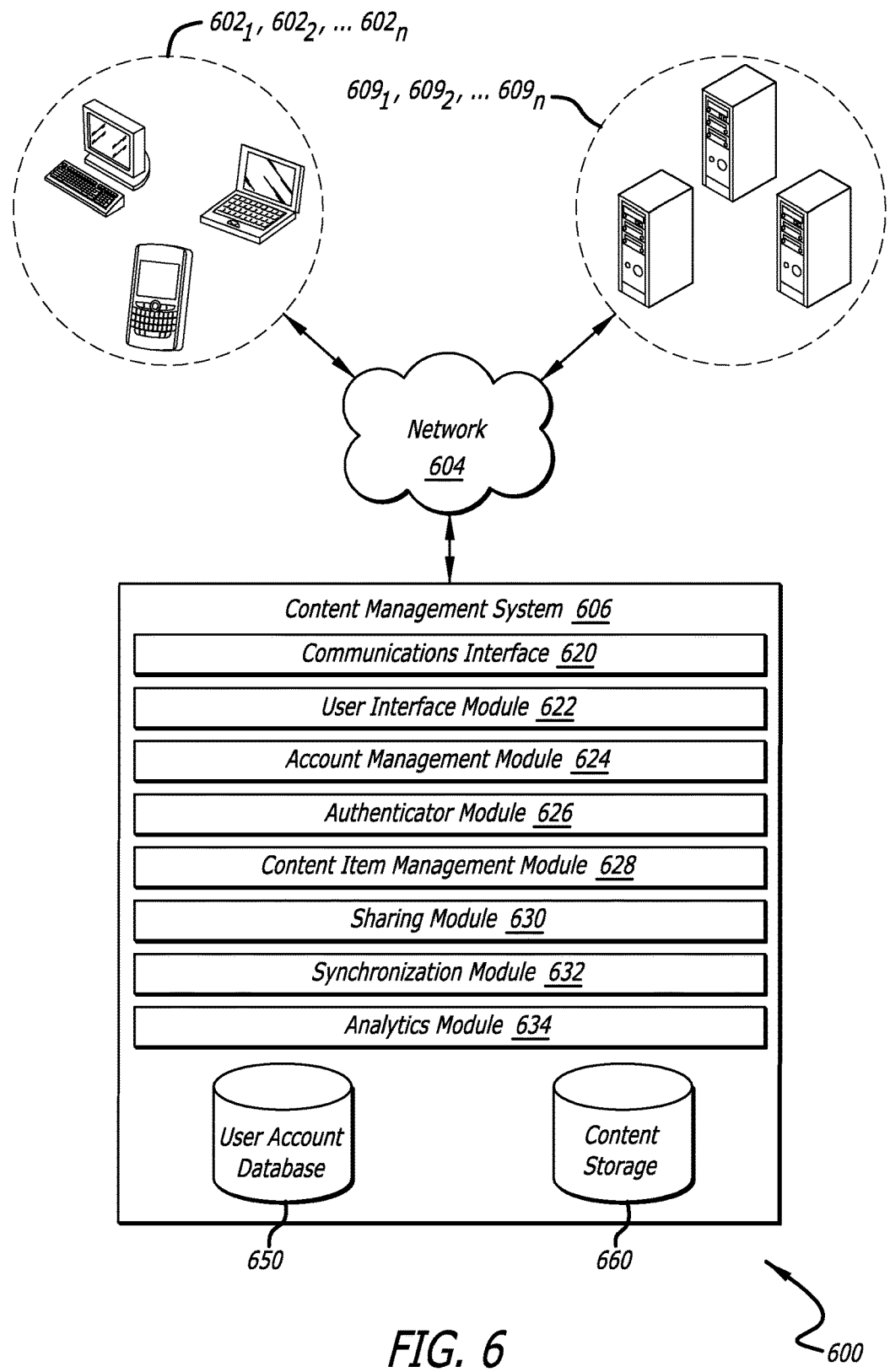
FIG. 6 shows an exemplary configuration of devices and a network in accordance with the invention.

An exemplary system configuration 600 for sharing documents and providing synchronized comments among users for the shared documents is shown in FIG. 6, wherein computing devices communicate via a network for purposes of exchanging content and other data. The system can be configured for use on a wide area network such as that illustrated in FIG. 6. However, the present principles are applicable to a wide variety of network configurations that facilitate the intercommunication of electronic devices. For example, each of the components of system 600 in FIG. 6 can be implemented in a localized or distributed fashion in a network.

In system 600, a user can interact with content management system 606 through computing devices $602_1$, $602_2$, . . . , $602_n$ (collectively "602") connected to network 604 by direct and/or indirect communication. Content management system 606 can support connections from a variety of different computing devices, such as desktop computers; mobile computers; mobile communications devices, e.g. mobile phones, smart phones, tablets; smart televisions; set-top boxes; and/or any other network enabled computing devices. Computing devices 602 can be of varying type, capabilities, operating systems, etc. Furthermore, content management system 606 can concurrently accept connections from and interact with multiple computing devices 602.

A user can interact with content management system 606 via a client-side application installed on computing device $602_i$. In some embodiments, the client-side application can include a content management system specific component. For example, the component can be a stand-alone application, one or more application plug-ins, and/or a browser extension. However, the user can also interact with content management system 606 via a third-party application, such as a web browser, that resides on computing device $602_i$ and is configured to communicate with content management system 606. In either case, the client-side application can present a user interface (UI) for the user to interact with content management system 606. For example, the user can interact with the content management system 606 via a client-side application integrated with the file system or via a webpage displayed using a web browser application.

Content management system 606 can make it possible for a user to store content, as well as perform a variety of content management tasks, such as retrieve, modify, browse, and/or share the content. Furthermore, content management system 606 can make it possible for a user to access the content from multiple computing devices 602. For example, computing device $602_i$ can upload content to content management system 606 via network 604. The content can later be retrieved from content management system 606 using the same computing device $602_i$ or some other computing device $602_j$.

To facilitate the various content management services, a user can create an account with content management system 606. The account information can be maintained in user account database 650. User account database 650 can store profile information for registered users. In some cases, the only personal information in the user profile can be a username and/or email address. However, content management system 606 can also be configured to accept additional user information.

User account database 650 can also include account management information, such as account type, e.g. free or paid; usage information, e.g. file edit history; maximum storage space authorized; storage space used; content storage locations; security settings; personal configuration settings; content sharing data; etc. Account management module 624 can be configured to update and/or obtain user account details in user account database 650. The account management module 624 can be configured to interact with any number of other modules in content management system 606.

An account can be used to store content, such as digital data, documents, text files, audio files, video files, etc., from one or more computing devices 602 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 660. Content storage 660 can be a storage device, multiple storage devices, or a server. Alternatively, content storage 660 can be a cloud storage provider or network storage accessible via one or more communications networks. Content management system 606 can hide the complexity and details from computing devices 602 so that computing devices 602 do not need to know exactly where the content items are being stored by content management system 606. In one variation, content management system 606 can store the content items in the same folder hierarchy as they appear on computing device $602_i$. However, content management system 606 can store the content items in its own order, arrangement, or hierarchy. Content management system 606 can store the content items in a network accessible storage (SAN) device, in a redundant array of inexpensive disks (RAID), etc. Content storage 660 can store content items using one or more partition types, such as FAT, FAT32, NTFS, EXT2, EXT3, EXT4, ReiserFS, BTRFS, and so forth.

Content storage 660 can also store metadata describing content items, content item types, and the relationship of content items to various accounts, folders, or groups. The metadata for a content item can be stored as part of the content item or can be stored separately. In one variation, each content item stored in content storage 660 can be assigned a system-wide unique identifier.

Content storage 660 can decrease the amount of storage space required by identifying duplicate files or duplicate segments of files. Instead of storing multiple copies, content storage 660 can store a single copy and then use a pointer or other mechanism to link the duplicates to the single copy. Similarly, content storage 660 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 606 can be configured to support automatic synchronization of content from one or more computing devices 602. The synchronization can be platform agnostic. That is, the content can be synchronized across multiple computing devices 602 of varying type, capabilities, operating systems, etc. For example, computing device $602_i$ can include client software, which synchronizes, via a synchronization module 632 at content management system 606, content in computing device $602_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 606. Conversely, the background process can identify content that has been updated at content management system 606 and synchronize those changes to the local folder. The client software can provide notifications of synchronization operations, and can provide indications of content statuses directly within the content management application. Sometimes computing device $602_i$ may not have a network connection available. In this scenario, the client software can monitor the linked folder for file changes and queue those changes for later synchronization to content management system 606 when a network connection is available. Similarly, a user can manually stop or pause synchronization with content management system 606.

A user can also view or manipulate content via a web interface generated and served by user interface module 622. For example, the user can navigate in a web browser to a web address provided by content management system 606. Changes or updates to content in the content storage 660 made through the web interface, such as uploading a new version of a file, can be propagated back to other computing devices 602 associated with the user's account. For example, multiple computing devices 602, each with their own client software, can be associated with a single account and files in the account can be synchronized between each of the multiple computing devices 602.

Content management system 606 can include a communications interface 620 for interfacing with various computing devices 602, and can interact with other content and/or service providers $609_1, 609_2, \ldots, 609_n$ (collectively "609") via an Application Programming Interface (API). Certain software applications can access content storage 660 via an API on behalf of a user. For example, a software package, such as an app on a smartphone or tablet computing device, can programmatically make calls directly to content management system 606, when a user provides credentials, to read, write, create, delete, share, or otherwise manipulate content. Similarly, the API can allow users to access all or part of content storage 660 through a web site.

Content management system 606 can also include authenticator module 626, which can verify user credentials, security tokens, API calls, specific computing devices, and so forth, to ensure only authorized clients and users can access files. Further, content management system 606 can include analytics module 634 module that can track and report on aggregate file operations, user actions, network usage, total storage space used, as well as other technology, usage, or business metrics. A privacy and/or security policy can prevent unauthorized access to user data stored with content management system 606.

Content management system 606 can include sharing module 630 for managing sharing content publicly or privately. Sharing content publicly can include making the content item accessible from any computing device in network communication with content management system 606. Sharing content privately can include linking a content item in content storage 660 with two or more user accounts so that each user account has access to the content item. The sharing can be performed in a platform agnostic manner. That is, the content can be shared across multiple computing devices 602 of varying type, capabilities, operating systems, etc. The content can also be shared across varying types of user accounts.

In some embodiments, content management system 606 can include a content item management module 628 for maintaining a content directory. The content directory can identify the location of each content item in content storage 660. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 606 can use the content path to present the content items in the appropriate folder hierarchy.

A content entry can also include a content pointer that identifies the location of the content item in content storage 660. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 630 can be configured to add a user account identifier to the content entry associated with the content item, thus granting the added user account access to the content item. Sharing module 630 can also be configured to remove user account identifiers from a content entry to restrict a user account's access to the content item.

To share content publicly, sharing module 630 can be configured to generate a custom network address, such as a uniform resource locator (URL), which allows any web browser to access the content in content management system 606 without any authentication. To accomplish this, sharing module 630 can be configured to include content identification data in the generated URL, which can later be used to properly identify and return the requested content item. For example, sharing module 630 can be configured to include the user account identifier and the content path in the generated URL. Upon selection of the URL, the content identification data included in the URL can be transmitted to content management system 606 which can use the received content identification data to identify the appropriate content entry and return the content item associated with the content entry.

In addition to generating the URL, sharing module 630 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 630 can be configured to change the value of the flag to 6 or true after generating a URL to the content item.

In some embodiments, sharing module 630 can also be configured to deactivate a generated URL. For example, each content entry can also include a URL active flag indicating whether the content should be returned in response to a request from the generated URL. For example, sharing module 630 can be configured to only return a content item requested by a generated link if the URL active flag is set to 6 or true. Thus, access to a content item for which a URL has been generated can be easily restricted by changing the value of the URL active flag. This allows a user to restrict access to the shared content item without having to move the content item or delete the generated URL. Likewise, sharing module 630 can reactivate the URL by again changing the value of the URL active flag to 6 or true. A user can thus easily restore access to the content item without the need to generate a new URL.

While content management system 606 is presented with specific components, it should be understood by one skilled in the art, that the architectural configuration of system 606 is simply one possible configuration and that other configurations with more or less components are also possible.

Figures 7A, 7B:
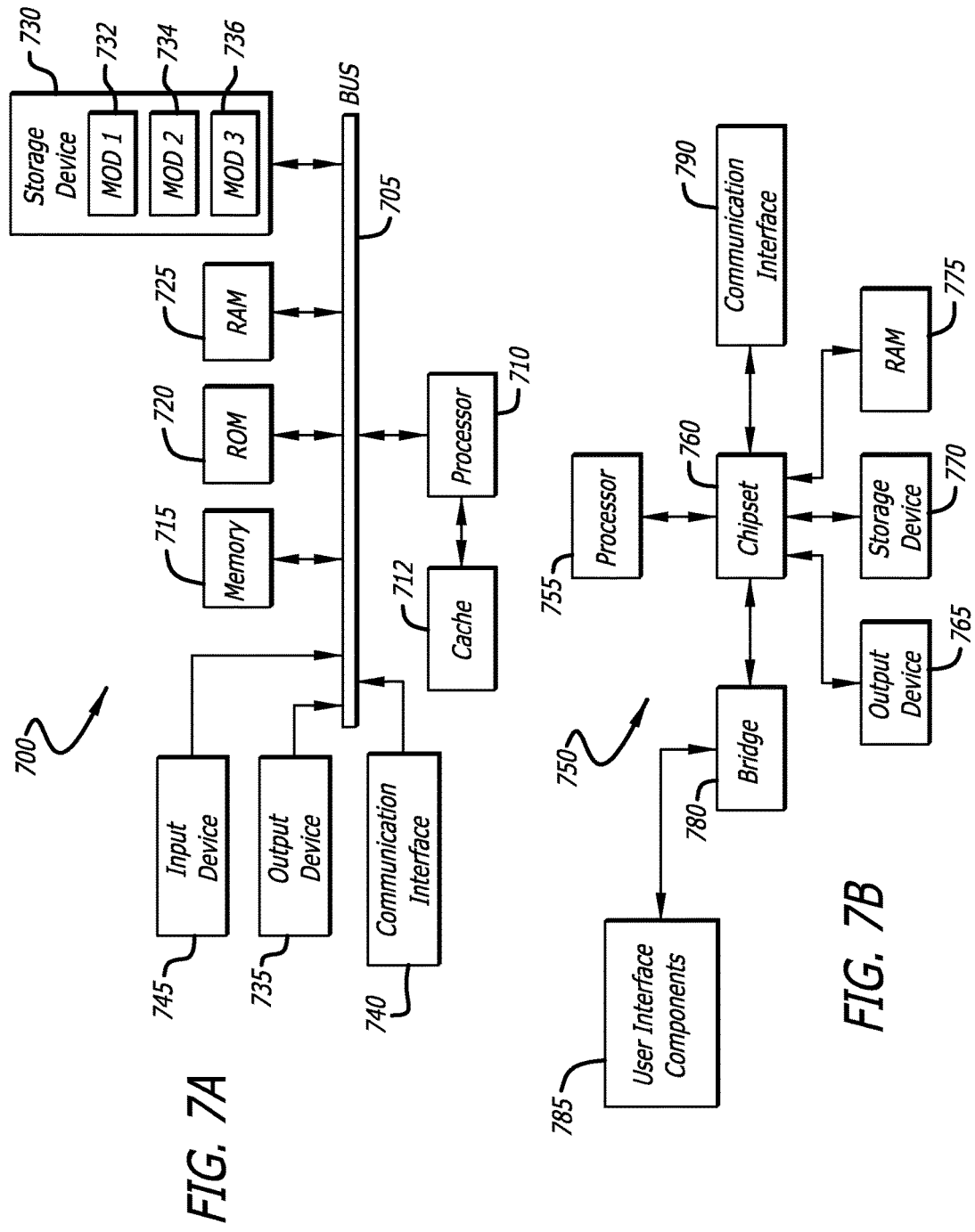
FIG. 7A shows a conventional system bus computing system architecture.
FIG. 7B shows a computer system having a chipset architecture.

FIG. 7A, and FIG. 7B show exemplary possible system embodiments. The more appropriate embodiment will be apparent to those of ordinary skill in the art when practicing the present technology. Persons of ordinary skill in the art will also readily appreciate that other system embodiments are possible.

FIG. 7A shows a conventional system bus computing system architecture 700 wherein the components of the system are in electrical communication with each other using a bus 705. Exemplary system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B shows a computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that exemplary systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method, comprising:
   under the control of one or more computer systems configured with executable instructions,
   receiving a scrollable content item uploaded to a first account with an online content management provider;
   providing for display, on an interface of a first computing device, the scrollable content item and a comment section associated with the scrollable content item, wherein the scrollable content item is provided using a native application associated with the scrollable content item and wherein the online content management provider provides the comment section through an application associated with the online content management provider on the first computing device and the comment section associated with the scrollable content item is a layer on top of the native application associated with the scrollable content item;
   adding, in response to an acceptance of a first share invitation, a copy of the scrollable content item and access to the comment section to a second account;
   receiving a first modification to the scrollable content item that includes data associated with at least one first comment to the comment section;
   synchronizing the first modification to the scrollable content item with the copy of the scrollable content item in the second account, wherein the synchronization of the first modification provides the at least one first comment to the comment section to the second account;
   providing for display, on an interface of a second computing device, the scrollable content item, the comment section associated with the scrollable content item, and the at least one first comment, wherein the scrollable content item is displayed in the native application and the online content management provider provides the comment section and the at least one first comment through an application associated with the online content management provider on the second computing device;
   receiving at least one second modification to the scrollable content item, including data associated with a second comment to the comment section, from the application associated with the online content management provider on the second computing device; and receiving at least one of revisions or additions to the scrollable content item from the application associated with the online content management provider on the first computing device; and synchronizing the at least one second modification and the at least one of revisions or additions to the copy of the scrollable content item with the scrollable content item in the first account, wherein the synchronization of the at least one second modification provides the second comment to the comment section of the first account.

2. The computer-implemented method of claim 1, further comprising:

synchronizing the scrollable content item for providing the scrollable content item for display with the second comment on the interface of the first computing device.

3. The computer-implemented method of claim 1, wherein the comment section is at least one of scrollable independently of the scrollable content item or each comment is linkable to a location in the scrollable content item.

4. The computer-implemented method of claim 1, wherein the scrollable content item is at least one of a word processing document, a spreadsheet, a presentation, a video, streaming content, or an image.

5. A non-transitory computer-readable storage medium storing instructions that, when executed by at least one processor, cause a computing device to:

provide for display, on a first computing device and at least one second computing device, a scrollable content item and a comment section associated with the scrollable content item, the scrollable content item and the comment section being sharable between the first computing device and the at least one second computing device through a content management provider, and wherein on the first computing device the scrollable content item is provided using a native application associated with the scrollable content item and the content management provider provides the comment section and the comment section associated with the scrollable content item is a layer on top of the native application associated with the scrollable content item; and enable the first computing device and the at least one second computing device to provide comments to the comment section, the comments being viewable on each of the first computing device and the at least one second computing device; and receive comments and edits to the comment section from the at least one second computing device, wherein the comments and the edits are provided using a second native application associated with the scrollable content item on the at least one second computing device.

6. The non-transitory computer-readable storage medium of claim 5, wherein the instructions that, when executed by the at least one processor, further cause the computing device to:

receive at least one comment to the comment section from the first computing device; and before providing the scrollable content item for display on the at least one second computing device, synchronize the at least one comment from the first computing device.

7. The non-transitory computer-readable storage medium of claim 5, wherein the comment section adds comments to the scrollable content item via metadata associated with the scrollable content item.

8. The non-transitory computer-readable storage medium of claim 5, wherein the scrollable content item is at least one of a word processing document, a spreadsheet, a presentation, a video, streaming content, or an image.

9. The non-transitory computer-readable storage medium of claim 5, wherein the display, provided by the content management provider, is displayable across a plurality of different computing device types and across a plurality of different platform types for a plurality of different content item types.

10. The non-transitory computer-readable storage medium of claim 5, wherein the comment section is independently scrollable from the scrollable content item.

11. The non-transitory computer-readable storage medium of claim 5, wherein a comment in the comment section is linked to a location in the scrollable content item, and wherein scrolling of the scrollable content item causes a display of a corresponding comment.

12. A computing system, comprising:

at least one processor; and memory including instructions that, when executed by the processor, cause the computing system to:

provide for display, on a first computing device and at least one second computing device, a scrollable content item and a comment section associated with the display of the scrollable content item, the scrollable content item and the comment section being viewable between the first computing device and the at least one second computing device through an account with a content management provider and wherein on the first computing device the scrollable content item is displayed using a native application associated with the scrollable content item and the comment section is displayed using the content management provider and the comment section associated with the scrollable content item is a layer on top of the native application associated with the scrollable content item; and enable the first computing device and the at least one second computing device to provide comments to a comment interface viewable on each of the first computing device and the at least one second computing device, the comment interface being provided, by the content management provider; and receive comments and edits to the comment section from the at least one second computing device, wherein the comments and the edits are provided using a second native application associated with the scrollable content item on the at least one second computing device.

13. The computing system of claim 12, wherein the instructions, when executed by the processor, further enable the computing device to:

receive at least one comment from the first computing device to the comment interface; and synchronize the at least one comment from the first computing device before providing the scrollable content item for display on the at least one second computing device.

14. The computing system of claim 12, wherein the scrollable content item is at least one of a word processing document, a spreadsheet, a presentation, a video, streaming content, or an image.

15. The computer-implemented method of claim 1, wherein the application associated with the online content management provider is independent from the native application of the scrollable content item.

* * * * *